(12) United States Patent
Ducellier (10) Patent No.: US 6,577,398 B1
(45) Date of Patent: Jun. 10, 2003

(54) RESONANT OPTICAL CAVITY

(75) Inventor: Thomas Ducellier, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/447,348

(22) Filed: Nov. 22, 1999

(51) Int. Cl.[7] ............................................. G01B 9/02
(52) U.S. Cl. ................................ 356/450; 356/519
(58) Field of Search ........................... 356/519, 450, 356/480

(56) References Cited

U.S. PATENT DOCUMENTS 6,252,716 B1 * 6/2001 Paiam ........................ 359/618

* cited by examiner

Primary Examiner—Frank G. Font
Assistant Examiner—Andrew H. Lee
(74) Attorney, Agent, or Firm—Neil Teitelbaum (57) ABSTRACT

A resonant optical cavity is disclosed that has a first partially reflective input end face and a second partially reflective end spaced a predetermined distance apart. The cavity is substantially angle insensitive to a beam of light launched into the cavity at a non-normal angle of incidence to the first input end face along a first line lying on a first plane orthogonal to the first input end face. The second end includes a retroreflector having at two or more partially reflective facts for redirecting light. An optical element having optical power such as a curved mirror or a lens for focusing light is disposed between the retroreflector and the other of the first and second ends. If the optical element having optical power is rotationally symmetrical the optical resonant cavity can be angle insensitive to all input angles. This device is particularly suited for use in the fabrication of an GT or MGT optical device.

27 Claims, 8 Drawing Sheets

NORMAL GT CAVITY:
FSR TUNABILITY WITH θy ANGLE

CAVITY LENGTH = d/cosθy

PRIOR ART

FIG. 3

FIXED FSR GT CAVITY WITH PARABOLIC MIRROR:
CONSTANT FSR WHATEVER θx!

BY DEFINITION OF A PARABOLA
=> CAVITY LENGTH = 2f = CONSTANT

BY DEFINITION OF FOCAL PLANE IN A PERFECT LENS:
=> CAVITY LENGTH = 2f = CONSTANT

RESONANT OPTICAL CAVITY

FIELD OF THE INVENTION

This invention relates generally to optical resonant cavities and more particularly to a resonant cavity that is angle insensitive to light launched into a cavity along a predetermined plane.

BACKGROUND OF THE INVENTION

Using optical signals as a means of carrying channeled information at high speeds through an optical path such as an optical waveguide i.e. optical fibres, is preferable over other schemes such as those using microwave links, coaxial cables, and twisted copper wires, since in the former, propagation loss is lower, and optical systems are immune to Electro-Magnetic Interference (EMI), and have higher channel capacities. High-speed optical systems have signaling rates of several mega-bits per second to several tens of giga-bits per second.

Optical communication systems are nearly ubiquitous in communication networks. The expression herein "Optical communication system" relates to any system that uses optical signals at any wavelength to convey information between two points through any optical path. Optical communication systems are described for example, in Gower, Ed. Optical communication Systems, (Prentice Hall, NY) 1993, and by P. E. Green, Jr in "Fiber optic networks" (Prentice Hall New Jersey) 1993, which are incorporated herein by reference.

As communication capacity is further increased to transmit an ever-increasing amount of information on optical fibres, data transmission rates increase and available bandwidth becomes a scarce resource.

High speed data signals are plural signals that are formed by the aggregation (or multiplexing) of several data streams to share a transmission medium for transmitting data to a distant location. Wavelength Division Multiplexing (WDM) is commonly used in optical communications systems as means to more efficiently use available resources. In WDM each high-speed data channel transmits its information at a pre-allocated wavelength on a single optical waveguide. At a receiver end, channels of different wavelengths are generally separated by narrow band filters and then detected or used for further processing. In practice, the number of channels that can be carried by a single optical waveguide in a WDM system is limited by crosstalk, narrow operating bandwidth of optical amplifiers and/or optical fiber non-linearities. Moreover such systems require an accurate band selection, stable tunable lasers or filters, and spectral purity that increase the cost of WDM systems and add to their complexity. This invention relates to a method and system for filtering or separating closely spaced channels that would otherwise not be suitably filtered by conventional optical filters.

Currently, internationally agreed upon channel spacing for high-speed optical transmission systems, is 100 Ghz, equivalent to 0.8 nm, surpassing, for example 200 Ghz channel spacing equivalent to 1.6 nanometers between adjacent channels. Of course, as the separation in wavelength between adjacent channels decreases, the requirement for more precise demultiplexing circuitry capable of ultra-narrow-band filtering, absent crosstalk, increases. The use of conventional dichroic filters to separate channels spaced by 0.4 nm or less without crosstalk, is not practicable; such filters being difficult if not impossible to manufacture.

In a paper entitled Multifunction optical filter with a Michelson-Gires-Turnois interferometer for wavelength-division-multiplexed network system applications, by Benjamin B. Dingle and Masayuki Izutsu published 1998, by the Optical Society of America, a device hereafter termed the MGT device provides some of the functionality provided by the instant invention. For example, the MGT device as exemplified in FIG. 1 serves as a narrow band wavelength demultiplexor; this device relies on interfering a reflected E-field with an E-field reflected by a plane mirror 16. The etalon 10 used has a 99.9% reflective back reflector 12r and a front reflector 12f having a reflectivity of about 10%; hence an output signal from only the front reflector 12f is utilized. A beam splitting prism (BSP) 18 is disposed to receive an incident beam and to direct the incident beam to the etalon 10. The BSP 18 further receives light returning from the etalon and provides a portion of that light to the plane mirror 16 and a remaining portion to an output port. Although this known MGT device appears to perform its intended function, it appears to have certain limitations. Furthermore, in the MGT device a finite optical path difference is required in the interferometer to produce an output response that mimics the one provided by the device of the instant invention. Typically for a 50 GHz free spectral range (FSR) this optical path difference would be a few millimeters; in contrast in the instant invention the optical phase difference need only be approximately $\lambda/4$ resulting in a more temperature stable and insensitive system. One limitation of the MGT device, which makes this device less than practicable, is its apparent requirement in the stabilization of both the etalon and the interferometer. Yet a further drawback to the MGT device is the requirement for an optical circulator to extract the output signal adding to signals loss and increased cost of the device.

This invention provides an optical circuit and a method of obviating the aforementioned limitations of the MGT device.

A Fabry-Perôt cavity is a well-known device generally having two spaced apart reflective surfaces between which light of a predetermined wavelength launched therein, will resonate. The free-spectral range (FSR) of a resonant cavity is related to the gap or space between its reflective surfaces.

The present invention provides a resonant cavity tunable along a line along a plane by launching an input beam at locations along that line while being substantially angle insensitive along a line along an orthogonal plane, wherein both planes are orthogonal to an input end face of the resonant cavity.

This device is particularly advantageous in the design of a temperature insensitive flat-top interleaver circuit. Prior art MGTs have not been commercially used in the past as they require independent tuning for the FSR of the GT and the OPD of the Michelson interferometer.

The independent tuning characteristics of the cavity in accordance with this invention allows the FSR of the GT resonator to be performed first followed by fine tuning the OPD in the interferometer with respectively vertical and horizontal angles. In essence a de-coupling is performed allowing tuning the GT resonator in one dimension without affecting the tuning of the OPD in the interferometer.

It is an object of this invention to provide an angle insensitive GT resonator having rotationally symmetric optics having little or no walk-off and little or no change in optical path length for a plurality of input angles.

It is a further object of an embodiment of this invention to provide a GT resonator that utilizes cylindrical optic wherein a line along a plane can be used to tune the path length of the GT to its appropriate value, while providing angle insensitivity an along an orthogonal line.

It is a further object of a preferred embodiment of this invention to provide a Michelson GT interferometer having a cylindrical GT is within the device, adjusted alone a first line by varying the input angle to its proper path length, while using angles along a second orthogonal line to finely tune the interferometer without affecting the GT's adjustments previously made.

SUMMARY OF THE INVENTION

In accordance with the invention there is provided, a resonant optical cavity comprising:

a first at least partially reflective end and a second at least partially reflective end spaced a predetermined distance apart, the resonant optical cavity being substantially angle insensitive to a collimated beam of light launched into the cavity at a non-normal angle of incidence to the first input end face along a first line lying on a first plane orthogonal to the first input end face, wherein one of the first and second ends includes a retroreflector having at least two at least partially reflective facets for redirecting light; and, an optical element having optical power for focusing light and disposed between the retroreflector and the other of the first and second ends.

In accordance with the invention, there is provided, a resonant optical cavity that has a substantially fixed optical path length for collimated light launched therein at an input end along a line at more than two different angles of incidence comprising:

a retroreflector having two or more least partially reflective facets for redirecting light within the cavity and for forming an end of the cavity and, an element having optical power disposed a predetermined distance from the two reflective surfaces and the input end.

In accordance with the invention there is further provided, a resonant cavity comprising:

a first at least partially reflective end and a second at least partially reflective end a predetermined distance apart, the resonant optical cavity being substantially angle insensitive to a collimated beam of light launched into the cavity at a non-normal angle of incidence to the first input end face along a first line lying on a first plane orthogonal to the first input end face and being substantially angle sensitive to a collimated beam launched into the cavity at a non-normal angle to the first input end face along a second line lying on a second plane orthogonal to the first plane and orthogonal to the first input end face, wherein the second at least partially reflective end includes a corner cube or a prism; and, an optical element having optical power.

In accordance with an broad aspect of the invention a resonant cavity is provided comprising:

a partially reflective input end face forming an end of the cavity;

a right angle retroreflector forming an end of the cavity; and, an element having optical power disposed between the input end face and the retroreflector for focusing light onto the retroreflector.

BRIEF DESCRIPTION OF THE DRAWINGS

Exemplary embodiments of the invention will now be described in conjunction with the drawings in which.

DETAILED DESCRIPTION

Figure 2:
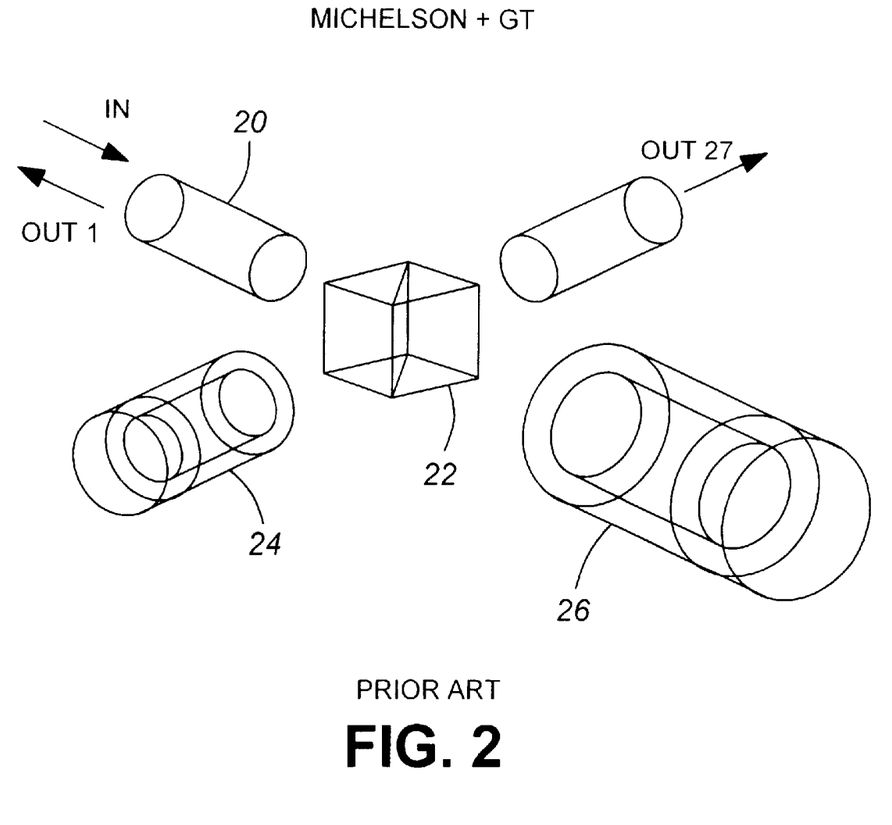
FIG. 2 is perspective diagram of a prior art MGT device for multiplexing and demultiplexing optical channels.
Figure 3:
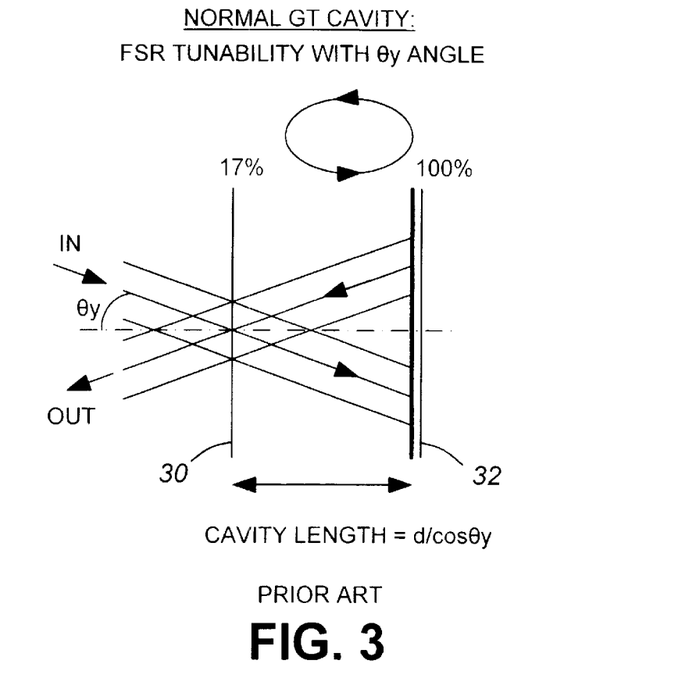
FIG. 3 is a prior art GT optical cavity illustrating the tunability of the FSR by varying the angle $\theta_y$ by small amounts.

Referring now to FIG. 2, a prior art arrangement is shown of a Michelson GT device having beam splitting cube 22 disposed between an input port 20 for providing a collimated beam, a mirror 24 for providing the Michelson arm portion of the device, a 25 Ghz GT etalon 26, and an output port 27. Components 20, 24, 26, and 27 are shown in this figure spaced from the beam splitter only for clarity. The operation of this multiplexing device is well known. Turning now to FIG. 3, a prior art side view of a GT cavity is shown having a partially reflecting input port facet 30 with a 50% reflectivity coating thereon. The other end of the cavity is a substantially 100% reflecting mirror 32. The cavity length is defined to be d/cos θy, where d is the optical path length shown as a dotted line through the centre of the cavity between the reflectors 30 and 32. In operation, the GT cavity shown can be tuned by a small amount by changing the input angle θy by a small increment. If the tuning angle is too large, there will be significant walk-off. A conventional cavity consists of two flat-coated facets.

Figure 4:
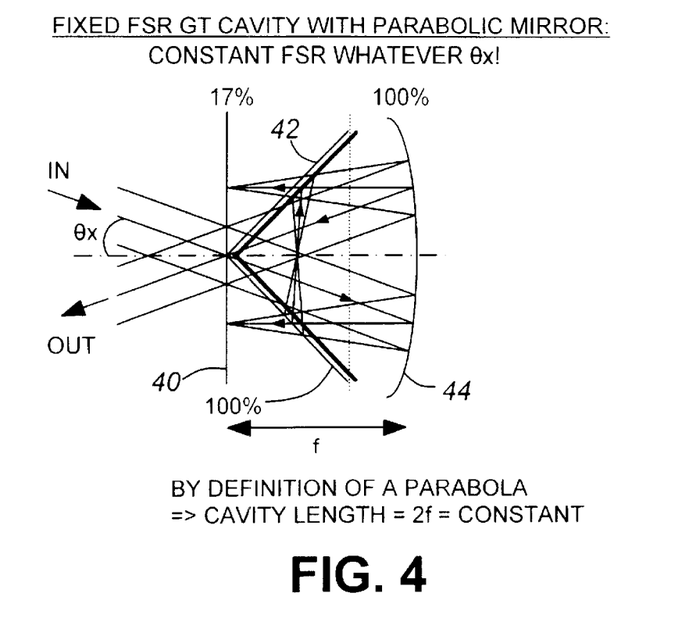
FIG. 4 is a cross-sectional side view of an concave mirror within an optical cavity having a corner cube and a partially reflective input end face forming cavity ends between which collimated light is circulated in accordance with an aspect of this invention.

In FIG. 4, a GT cavity is shown having a Fixed FSR. The cavity in accordance with an embodiment of this invention has an input end having a 17% reflective face 40 and has a concave mirror 44 providing optical power for focusing light upon a corner cube 42. What is noted in this embodiment is that the GT cavity has a substantially constant FSR when θx is varied. For the device of FIG. 4 to be functional an opening in the corner cube is required to allow an input beam to be launched into the cavity.

Figure 5:
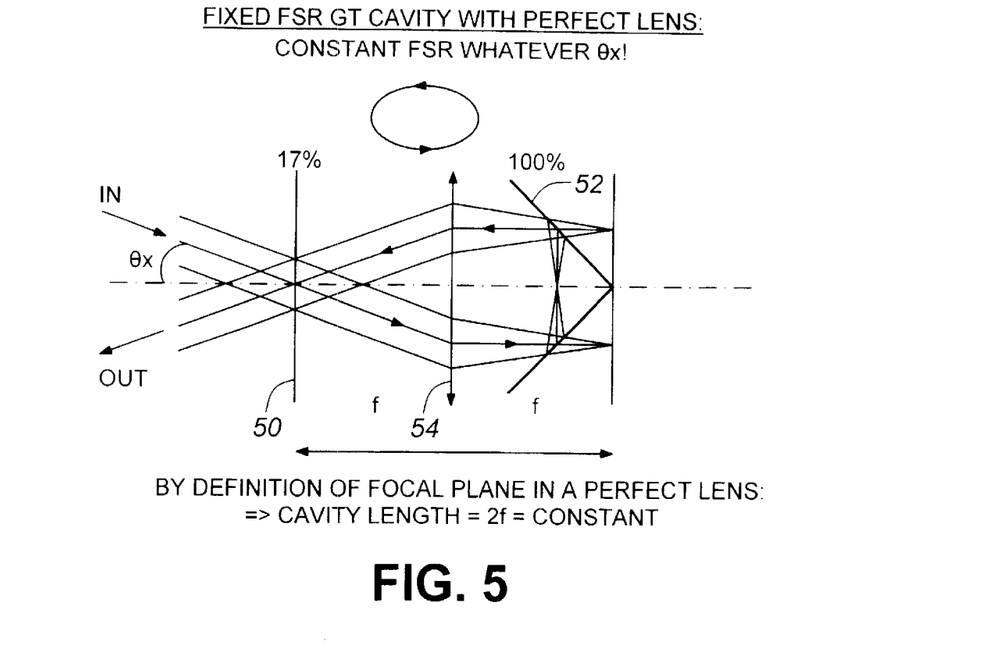
FIG. 5 is a side cross-sectional view of an optical cavity in accordance with an alternative embodiment of the invention having a fixed FSR and having a lens disposed between a partially reflective input end face and a retroreflector end.

FIG. 5 illustrates an alternative embodiment of the invention wherein a GT cavity is shown having a input end 50 having a 17% reflective end face and another end formed by a retroreflector in the form of a corner cube 52. This device is designed to receive and output a collimated beam of light. A lens 54 (or a curved mirror) serving as a focusing element is disposed between the input end face 50 and the corner cube 52. The optical elements are disposed in a "4f" arrangement such that the distance between the input facet and the lens and the distance between the lens and the back of the retroreflector is equal and equal to the focal length of the lens. By providing this configuration of optical elements the optical path of the light is substantially insensitive to the input angle of the input collimated beam, and furthermore that the position of the output beam is not shifted with respect to that of the input beam; this shift effect is often seen in classical cavities and referred to as "walk-off".

Figure 6:
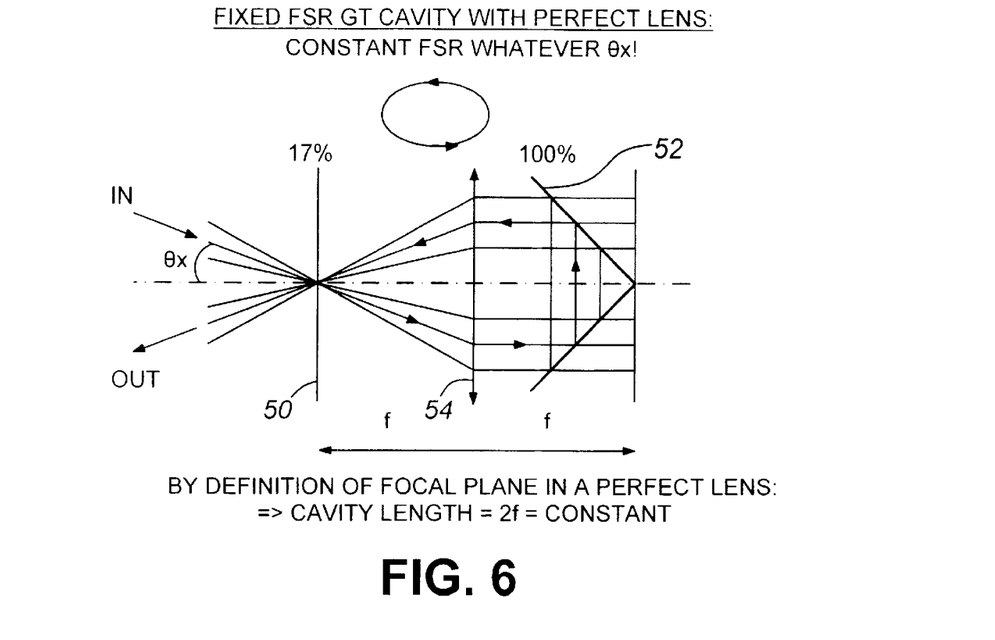
FIG. 6 is a is a side cross-sectional view of an optical cavity in accordance an embodiment of the invention similar to that of FIG. 5, however designed to accept uncollimated input light.

FIG. 6 is a similar embodiment to that of FIG. 5, however the device is designed to receive uncollimated light and viewed as less practicable because the light is focused on the input coated flat facet, which could potentially destroy the coating.

Figure 7:
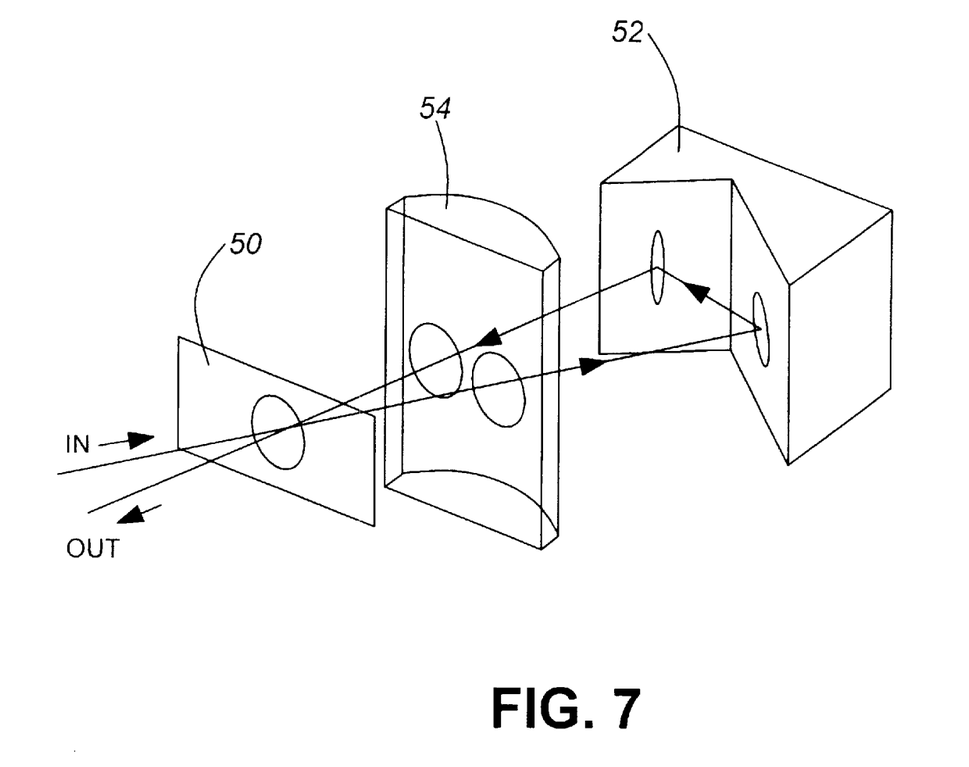
FIG. 7 is a perspective view of the optical cavity depicted in FIG. 5.

FIG. 7 illustrates a perspective view of the embodiment shown in FIG. 5, wherein a cylindrical lens 54 is disposed between an input facet 50 and a right angle retroreflector 52 in a 4-f arrangement.

Figure 8:
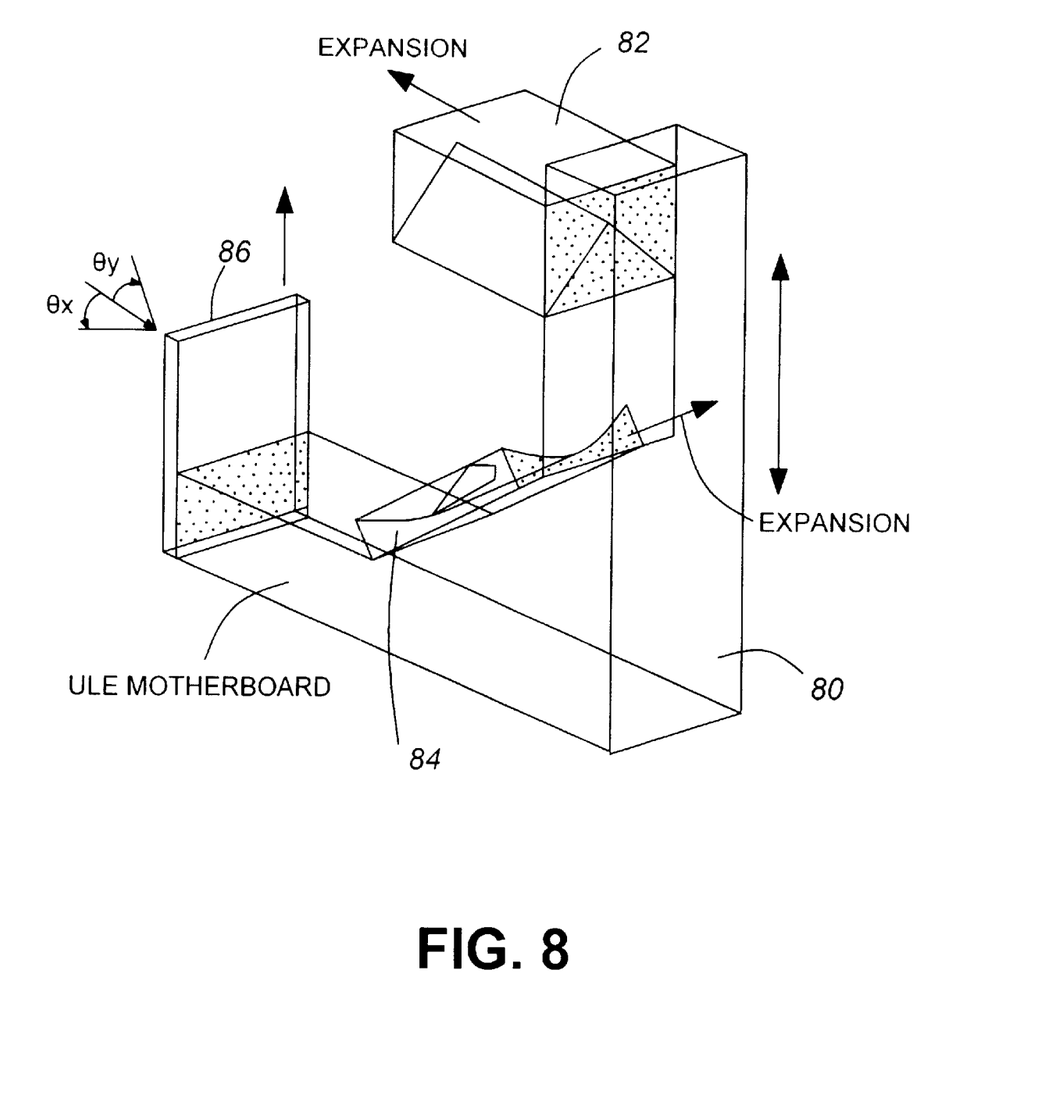
FIG. 8 is an isometric view of a Gires-Tournois cavity shown in accordance with this invention.

FIG. 8 shows a preferred embodiment of the invention wherein a GT cavity is arranged on an L-shaped support structure. The L-shaped support structure 80 at an upper end supports a right angled retroreflector 82 disposed to receive and redirect light from and to a cylindrical parabolic mirror 84 positioned in the middle of the L-shaped support structure. The input facet 86 coated with a coating such that it is preferably 17% reflective is located at an opposite end of the L-shaped support structure. The retroreflector 82 is coated with a 100% reflective coating, as is the cylindrical parabolic mirror 84.

The device of FIG. 8 is substantially angle insensitive along a line θx along the input facet and is angle sensitive and tunable along a line θy orthogonal to θx. Due to the fact that medium within the cavity is air, and the cavity is mounted on a substrate having a low thermal expansion and in addition, the manner in which the retroreflector 82, the parabolic mirror 84 and the input facet 86 are disposed and glued in place, the GT cavity is substantially temperature insensitive. For example if the retroreflector is shifted in position due to thermal expansion or contraction of the adhesive with which it is mounted to the L-shaped support structure, there will be substantially no affect on the performance of the device; this is due to the direction of movement of the retroreflector 82; hence the optical path length between 82 and the mirror 84 remains constant. Dots at end faces of 82, 84, and 86 are shown to indicate preferred surfaces to which adhesive is applied so as to preserve the optical path length followed by a beam propagating between these components.

Figure 9:
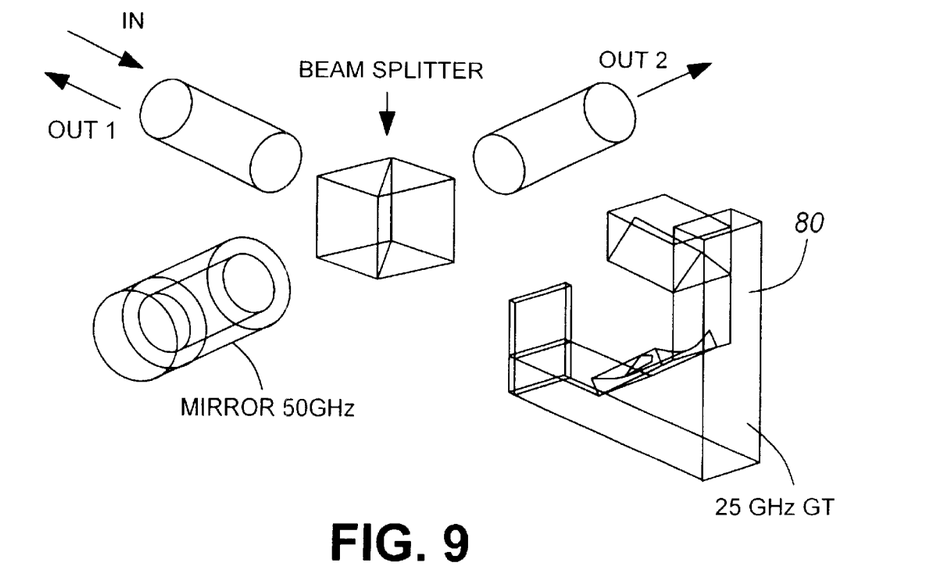
FIG. 9 is a perspective view of a 50 Ghz interleaver circuit that incorporates the GT cavity shown in FIG. 8, wherein variation in angles $\theta_y$ are used to tune the FSR of the GT cavity and wherein variations in $\theta_x$ are used to tune the optical path length of the Michelson arm.
Figure 10:
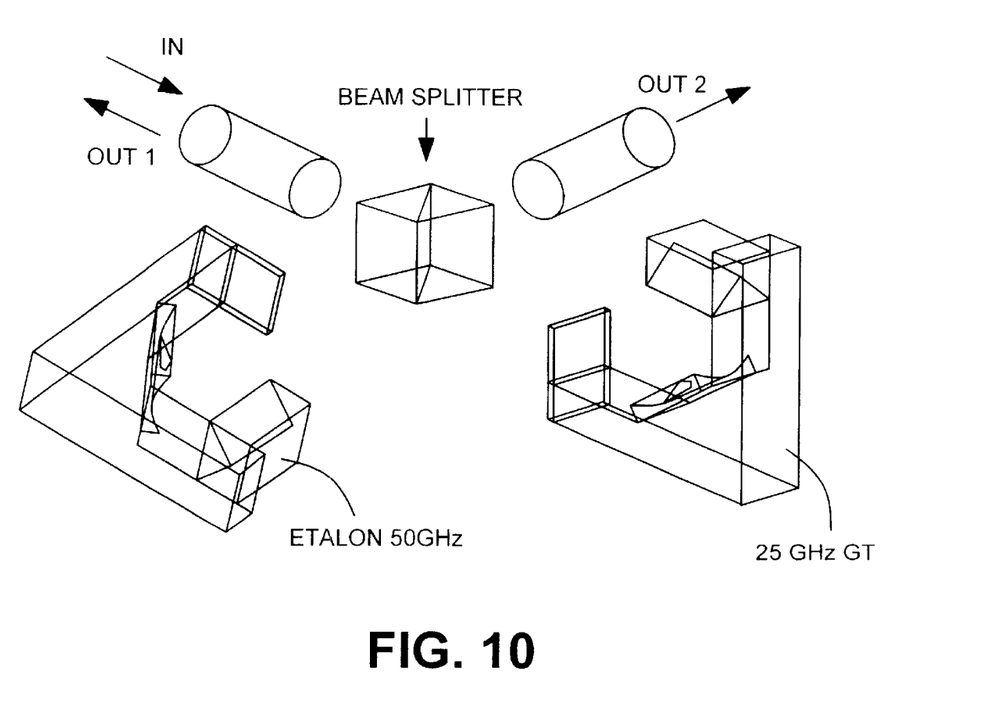
FIG. 10 is a perspective view of an alternative embodiment of 50 Ghz interleaver circuit that incorporates the GT cavity shown in FIG. 8, wherein variation in angles $\theta_y$ are used to tune the FSR of the GT cavity and wherein variations in $\theta_x$ are used to tune the optical path length of the Michelson arm.

Turning now to FIG. 9, an isometric diagram illustrates a substantially flat-topped athermal 25 Ghz interleaver design in accordance with a preferred embodiment of the invention including the 25 Ghz GT etalon shown in detail in FIG. 8. This figure is similar to FIG. 2, with the exception that the preferred embodiment of the 25 Ghz GT device is shown. In FIG. 9 the 25 Ghz GT 80 replaces the GT 26 of FIG. 2. This embodiment de-couples the tuning of the GT from the tuning of the Michelson arm. Hence θy is used to tune the GT and θx is used to tune the optical path length between of the Michelson arm. Since the GT 80 is angle insensitive along the x-axis, there will be minimal or essentially no effect upon the GT 80 while tuning the optical path length of the Michelson arm.

Figure 1:
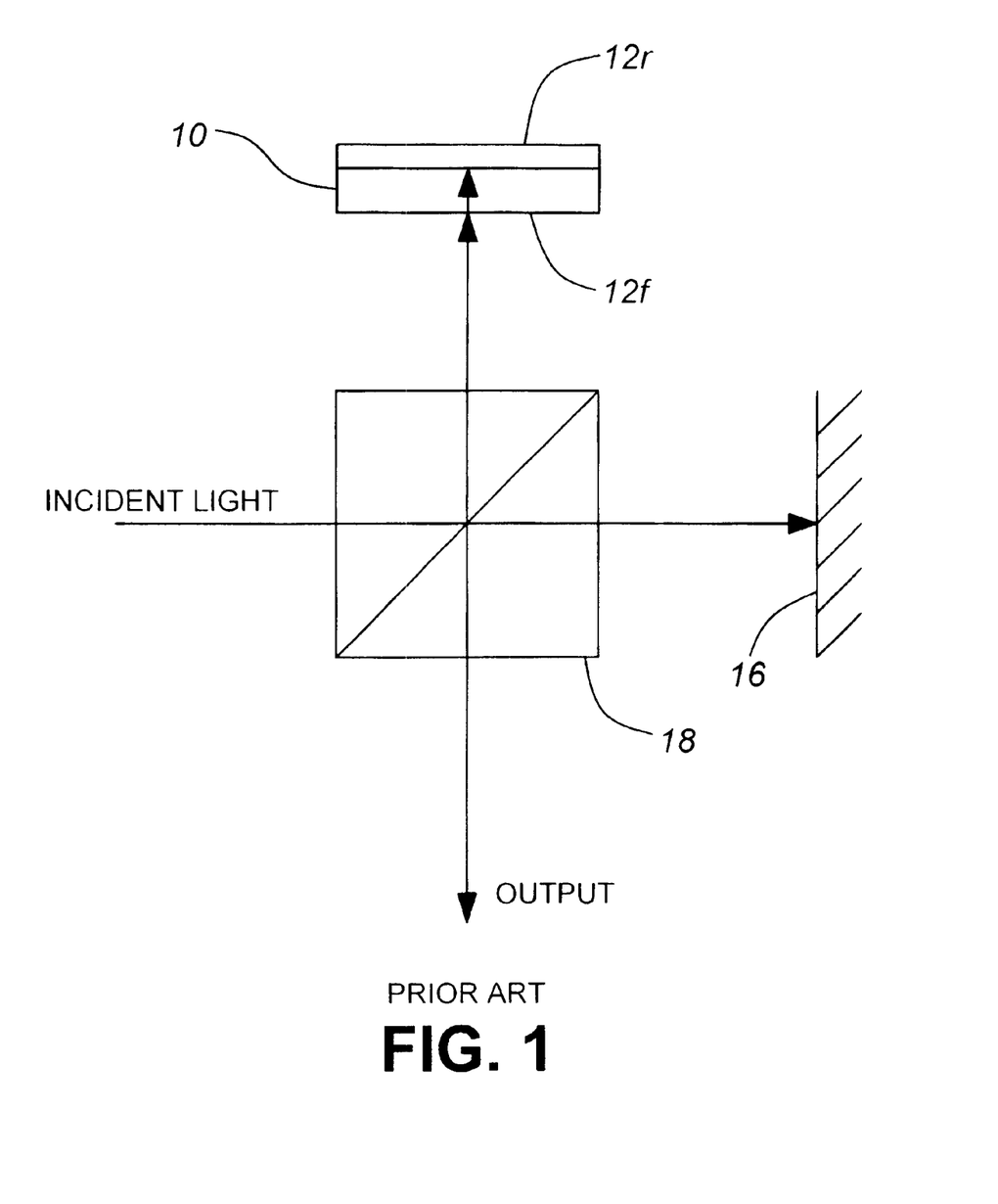
FIG. 1 is a schematic diagram of an MGT device, which serves as a narrow band wavelength demultiplexor which relies on interfering a reflected E-field with an E-field reflected by a plane mirror.

The embodiment depicted if FIGS. 8 and 9 allows tuning the GT cavity in one direction similar to the cavity shown in FIGS. 1 or 2 by varying the optical path length by changing the input angle, while still being insensitive with respect to the second input angle. This provides an extra degree of freedom to adjust other elements elsewhere in a complex optical system.

In order to achieve complete angle insensitivity so that the cavity will be angle insensitive for all useful input angles with respect to light impinging the input facet a focusing element having optical power is required that is rotationally symmetric, for example a rotationally symmetric lens or concave mirror. In such a cavity the acceptance angle is very wide having substantially no walk-off, and substantially no change in the path length for any angle in any direction. Of course this can only be achieved with very high precision components and tolerances.

The invention described heretofore in the detailed description can be generalized to include variations while providing the required functionality.

For example a lens can be replaced by curved mirror, or more generally by another focusing optical system.

The retroreflector shown as a corner cube or right angle prism can be replaced by other light inverting devices, such as a Dove prism, roof prism, penta prism and the like, or a combination of such elements with mirrors.

The optical arrangement described in the preferred embodiments is a 4f configuration; however other embodiments may be envisaged that may differ from the optimum "4f" configuration, although it is believed to be less efficient (there will be some walk-off and defocusing in the cavity, limiting the finesse of the cavity).

Figure 11:
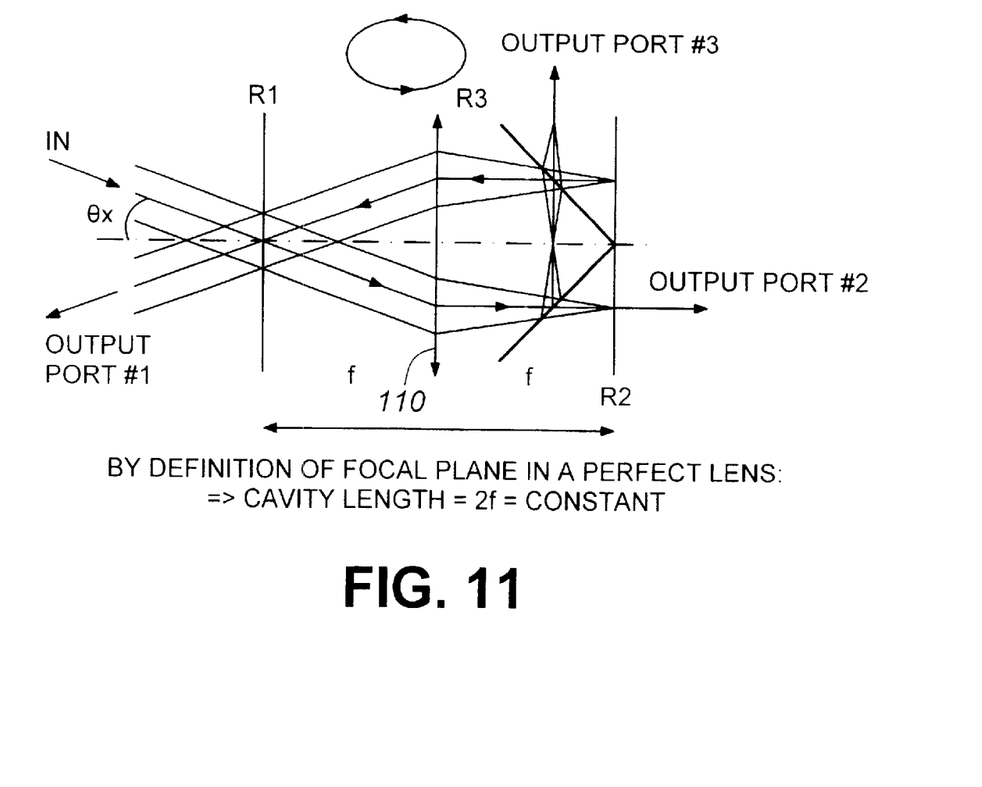
FIG. 11 is a side cross-sectional view of a four-port GT cavity, having an input port, and output port, and two tap output ports; and, FIG. 12 is an alternative embodiment of the invention that utilizes optical power in the form of graded-index lenses.

An alternative embodiment of a GT device is shown in FIG. 11. As in the previous embodiments, an optical element 110 having optical power is disposed such that it focuses a collimated input beam upon the dual facet retroreflector. The input facet and the two facets or more of the retroreflector are coated with a reflective coating. In this embodiment where the two facets of the retroreflector are to serve both as reflectors and tap ports it is preferable that R2 and R3 are close to but less than 100% reflective, allowing a small amount of light incident thereon to exit therethrough, for example, for monitoring purposes. The reflectivity of R1 is preferably approximately 17%. More ports are possible with multiple facets retroreflectors.

Figure 12:
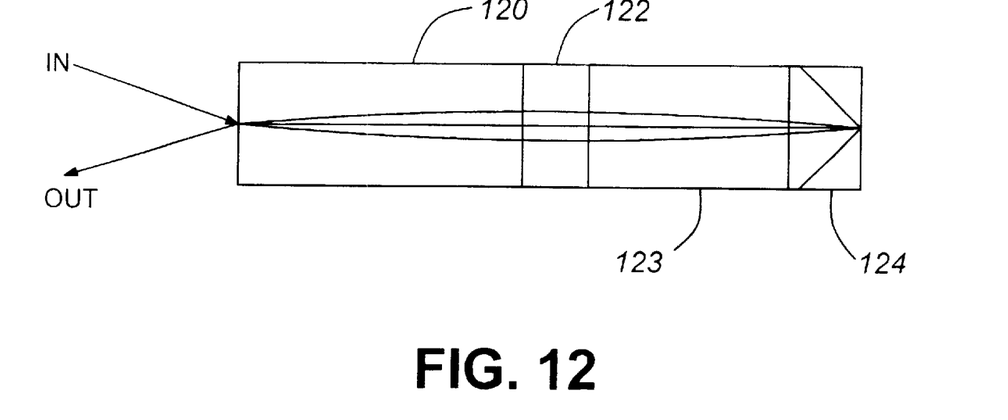

Turning now to FIG. 12 an alternative embodiment of the invention is shown wherein a GT optical cavity is formed of a plurality of glass block-like elements abutted end to end forming a compact, easy to manufacture device lessening typical difficulties normally associated with aligning optical components. Graded-index (GRIN) Rod lenses are produced under the trade name "SELFOC"; the mark is registered in Japan and owned by the Nippon Sheet and Glass Co. Ltd. In this embodiment two GRIN lenses provide the required optical power. At an input/output end of the device a quarter pitch GRIN lens 120 SLS 1.0, having a length 3.263 mm collimates the light from the input fiber and focuses the light to the output fiber. The flat input facet of the cavity is coated to a reflectivity of R1. A glass spacer 122 has a thickness 0.64 mm is equal to that of the corner cube retroreflector and made of BK7 and a second GRIN lens 123 being a nearly quarter pitch lens 2.613 mm long, are of a length suitable to ensure that light is focused upon a corner cube retroreflector 124 coupled to the GRIN lens. The optical path length in the cavity is 5.994 mm in air, corresponding to 25 GHz FSR. In order to ensure the 4-f configuration proper lens selection that will give the correct optical cavity length must be made. The device shown in FIG. 12 is a substantially angle insensitive GT resonator having a 25 GHz free spectral range.

Of course, numerous other embodiments may be envisaged without departing from the spirit and scope of the invention.

What is claimed is:

1. A resonant optical cavity comprising:
   a first at least partially reflective input end face and a second at least partially reflective end spaced a predetermined distance apart, the resonant optical cavity being substantially angle insensitive to a beam of light launched into the cavity at a non-normal angle of incidence to the first input end face along a first line lying on a first plane orthogonal to the first input end face, wherein one of the first and second ends includes a retroreflector having at least two at least partially reflective facets for redirecting light; and, an optical element having optical power for focusing light and disposed between the retroreflector and the other of the first and second ends.

2. A resonant optical cavity as defined in claim 1, wherein the resonant optical cavity is substantially angle insensitive to a collimated beam of light launched into the cavity at a non-normal angle of incidence to the first input end face along a first line lying on a first plane orthogonal to the first input end face.

3. A resonant optical cavity as defined in claim 2, wherein the optical element having optical power is a lens disposed a predetermined distance from the retroreflector for focusing light upon the retroreflector.

4. A resonant optical cavity as defined in claim 2, wherein the optical element having optical power is an at least partially reflective curved mirror disposed a predetermined distance from the retroreflector for focusing light upon the retroreflector.

5. A resonant optical cavity as defined in claim 1, wherein an optical path length between the first end and optical element having optical power is substantially equal to a focal length of the optical element having optical power.

6. A resonant optical cavity as defined in claim 5, wherein an optical distance between the element having optical power to the retroreflector is substantially equal to focal length of element having power.

7. A resonant optical cavity that has a substantially fixed optical path length for collimated light launched therein at an input end along a line at more than two different angles of incidence comprising:
   a retroreflector having two or more least partially reflective facets for redirecting light within the cavity and for forming an end of the cavity and,
   an element having optical power disposed a predetermined distance from the two reflective surfaces and the input end.

8. A resonant optical cavity as defined in claim 7, wherein the reflective facets are planar.

9. A resonant optical cavity as defined in claim 7, wherein the optical element having optical power is disposed between the retroreflector and the input end.

10. A resonant optical cavity as defined in claim 9, wherein the optical path length between input end and element having power is substantially equal to the focal length $F_L$ of the element having optical power, and wherein the distance between lens and retroreflector is substantially equal to $F_L$.

11. A resonant cavity as defined in claim 1, wherein the element having optical power is a curved at least partially reflective surface, the curved at least partially reflective surface forming an end face of the optical cavity spaced by a predetermined distance from the other end of the cavity.

12. A resonant cavity as defined in claim 1, wherein the element having optical power is a lens which is rotationally symmetric about an axis along a length of the cavity, the lens being disposed between the at least partially reflective end face and the corner cube or prism.

13. A resonant cavity comprising:
   a first at least partially reflective end and a second at least partially reflective end a predetermined distance apart, the resonant optical cavity being substantially angle insensitive to a collimated beam of light launched into the cavity at a non-normal angle of incidence to the first input end face along a first line lying on a first plane orthogonal to the first input end face and being substantially angle sensitive to a collimated beam launched into the cavity at a non-normal angle to the first input end face along a second line lying on a second plane orthogonal to the first plane and orthogonal to the first input end face, wherein the second at least partially reflective end includes a corner cube or a prism; and,
   an optical element having optical power.

14. A resonant cavity as defined in claim 13, wherein optical element having optical power is the first at least partially reflective end.

15. A resonant cavity comprising:
   a partially reflective input end face forming an end of the cavity;
   a retroreflector forming an end of the cavity; and,
   an element having optical power disposed between the input end face and the retroreflector for focusing light onto the retroreflector.

16. A resonant cavity as defined in claim 15 wherein the element having optical power comprises a rotationally symmetric lens.

17. A resonant cavity as defined in claim 15 wherein the element having optical power is a curved mirror that is at least partially reflective.

18. A resonant cavity as defined in claim 16, wherein the rotationally symmetric lens is disposed intermediate the input end face and the retroreflector, and wherein the retroreflector has planar reflecting surfaces.

19. A resonant cavity as defined in claim 15, wherein the element having focusing power is a curved mirror and wherein the partially reflective input end face, the retroreflector and the curved mirror are affixed to a support structure with adhesive.

20. A resonant cavity as defined in claim 19, wherein the element having optical power is cylindrical.

21. A resonant cavity as defined in claim 19, wherein the support structure is substantially L-shaped.

22. A resonant cavity as defined in claim 19 wherein adhesive is applied to predetermined surfaces such that when expansion of joints having adhesive therein occurs, the optical path length between the curved mirror, the reflective input end face and the retroreflector remains substantially constant for light input into the resonant cavity.

23. An Michelson GT optical interferometer comprising:
   a) a beam splitting cube for splitting an input beam into two sub-beams;
   b) a first resonant optical cavity having a partially reflective input end face forming an end of the cavity; a right angle retroreflector forming an end of the cavity; and, an element having optical power disposed between the input end face and the retroreflector for focusing light onto the retroreflector, said cavity disposed to receive a first of the two sub-beams and to reflect light back to the beam splitting cube; and,
   c) a reflective surface disposed to receive and reflect a second of the two sub-beams back to the beam splitting cube.

24. A resonant cavity as defined in claim 15 further comprising a beam splitter for providing a portion of an input beam into the cavity and for providing another portion of the input beam to a Michelson reflector, the beam splitter disposed to receive and combine light from the Michelson reflector and the cavity.

25. A resonant cavity as defined in claim 15 wherein the element having optical power comprises a first GRIN lens.

26. A resonant cavity as defined in claim 25 further comprising a second GRIN lens to spaced from and optically coupled with the first GRIN lens and having a light transmissive spacer element therebetween.

27. A resonant optical cavity as defined in claim 26 wherein the retroreflector is disposed at an end of one of the GRIN lenses.

* * * * *